United States Patent
Tabata et al.

(10) Patent No.: US 11,932,137 B2
(45) Date of Patent: Mar. 19, 2024

(54) FOUR-WHEEL-DRIVE VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Masato Nakano, Toyota (JP); Yuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 537 days.

(21) Appl. No.: 17/248,683

(22) Filed: Feb. 3, 2021

(65) Prior Publication Data

US 2021/0268911 A1    Sep. 2, 2021

(30) Foreign Application Priority Data

Feb. 27, 2020    (JP) ................................ 2020-032449

(51) Int. Cl.
    *H02K 17/32*    (2006.01)
    *B60L 7/18*    (2006.01)
    *B60L 15/20*    (2006.01)

(52) U.S. Cl.
    CPC ............. *B60L 7/18* (2013.01); *B60L 15/2009* (2013.01); *B60L 2240/12* (2013.01); *B60L 2240/423* (2013.01); *B60L 2260/28* (2013.01)

(58) Field of Classification Search
    CPC .... H02P 6/20; H02P 21/36; B60L 7/18; B60L 15/2009; B60L 2240/12; B60L 2240/423; B60L 2260/28
See application file for complete search history.

(56) References Cited

U.S. PATENT DOCUMENTS

2008/0185199 A1 *   8/2008   Kimura ................... B60K 6/445
                                                     188/110
2012/0190499 A1    7/2012   Oba

FOREIGN PATENT DOCUMENTS

CN          113830067 A * 12/2021              B60K 1/04
WO    WO 2011/042951 A1    4/2011

* cited by examiner

*Primary Examiner* — Karen Masih
(74) *Attorney, Agent, or Firm* — Oblon, McClelland, Maier & Neustadt, L.L.P.

(57) ABSTRACT

A regenerative torque upper limit is set to a larger value when a rear-wheel distribution ratio is small than when the rear-wheel distribution ratio is large. Accordingly, when a distribution of a drive power to front wheels is large, a regenerative torque of a second rotary machine can be increased such that wheels are less likely to slip at the time of performing of regeneration control when the distribution of the drive power to the front wheels is small in comparison with a case in which the regenerative torque upper limit is set to a constant value similarly to when the distribution of the drive power to the front wheels is small. In this way, it is possible to increase the regenerative torque of the second rotary machine according to the rear-wheel distribution ratio.

5 Claims, 6 Drawing Sheets

PU: 12, MG1, MG2

CB: C1, C2, B1, B2

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

FOUR-WHEEL-DRIVE VEHICLE

CROSS-REFERENCE TO RELATED APPLICATION

This application claims priority to Japanese Patent Application No. 2020-032449 filed on Feb. 27, 2020, incorporated herein by reference in its entirety.

BACKGROUND

1. Technical Field

The disclosure relates to a four-wheel-drive vehicle that can adjust a ratio of drive powers which are transmitted to main driving wheels and sub driving wheels.

2. Description of Related Art

A four-wheel-drive vehicle including a drive power source that includes at least a rotary machine, a drive power distribution device that can transmit a drive power from the drive power source to main driving wheels and sub driving wheels and adjust a main-side distribution ratio which is a ratio of a drive power transmitted from the drive power source to the main driving wheels to a total drive power transmitted from the drive power source to the main driving wheels and the sub driving wheels, and a control device that controls the rotary machine and the drive power distribution device is well known. An example thereof is a four-wheel-drive vehicle described in WO 2011/042951.

SUMMARY

In the four-wheel-drive vehicle described in WO 2011/042951, regeneration control using the rotary machine may be performed at the time of deceleration of the vehicle. In this case, for example, it is conceivable that an upper limit of a regenerative torque of the rotary machine in regeneration control be set to limit the regenerative torque such that slipping of wheels of the vehicle is curbed. On the other hand, in a four-wheel-drive vehicle in which the main-side distribution ratio changes, that is, a distribution of a drive power to the main driving wheels and the sub driving wheels changes, a distribution of a braking force in regeneration control which is applied to the main driving wheels and the sub driving wheels also changes with the change of the main-side distribution ratio. Accordingly, when the upper limit of the regenerative torque is set to a constant value regardless of the main-side distribution ratio, there is concern about maximization of the regenerative torque not being achieved.

The disclosure provides a four-wheel-drive vehicle that can achieve maximization of a regenerative torque of a rotary machine in regeneration control at the time of deceleration of the vehicle.

According to a first aspect of the disclosure, there is provided a four-wheel-drive vehicle including: (a) a drive power source configured to include at least a rotary machine; a drive power distribution device configured to transmit a drive power from the drive power source to main driving wheels and sub driving wheels and to adjust a main-side distribution ratio which is a ratio of a drive power which is transmitted to the main driving wheels to a total drive power which is transmitted from the drive power source to the main driving wheels and the sub driving wheels; and a control device configured to control the rotary machine and the drive power distribution device, (b) wherein the control device is configured to perform regeneration control using the rotary machine at the time of deceleration of the vehicle, to limit a regenerative torque of the rotary machine using a preset upper limit of the regenerative torque in the regeneration control, and to set the upper limit to a value which is larger when the main-side distribution ratio is small than when the main-side distribution ratio is large.

A second aspect of the disclosure provides the four-wheel-drive vehicle according to the first aspect, wherein the control device is configured to set an upper limit which does not depend on the main-side distribution ratio when it is determined that a control state of the drive power distribution device is not determined and to set the upper limit which does not depend on the main-side distribution ratio to a value equal to or less than a value which is set when the main-side distribution ratio is large.

A third aspect of the disclosure provides the four-wheel-drive vehicle according to the second aspect, wherein the value which is set when the main-side distribution ratio is large is a value which is set when the four-wheel-drive vehicle is in a two-wheel drive state.

A fourth aspect of the disclosure provides the four-wheel-drive vehicle according to the first aspect, wherein the control device is configured to set an upper limit which does not depend on the main-side distribution ratio when it is determined that a control state of the drive power distribution device is not determined and to set the upper limit which does not depend on the main-side distribution ratio to a value which is obtained by limiting the upper limit based on the main-side distribution ratio which has been set immediately before it has been determined that the control state of the drive power distribution device is not determined at a predetermined ratio or by subtracting a predetermined value from the upper limit.

A fifth aspect of the disclosure provides the four-wheel-drive vehicle according to any one of the second to fourth aspects, wherein the control device is configured to set the upper limit which does not depend on the main-side distribution ratio to a value which is larger when a vehicle speed is low than when the vehicle speed is high.

A sixth aspect of the disclosure provides the four-wheel-drive vehicle according to any one of the first to fifth aspects, wherein the control device is configured to activate a wheel brake device which is provided to adjust braking forces of wheel brakes applied to the main driving wheels and the sub driving wheels such that a required braking force is realized when a braking force of the four-wheel-drive vehicle is insufficient for the required braking force due to change of the upper limit based on change of the main-side distribution ratio and to apply the braking forces of the wheel brakes such that a distribution of the braking force of the four-wheel-drive vehicle applied to the main driving wheels and the sub driving wheels does not change from that before the upper limit changes when the wheel brake device is activated.

According to the first aspect, when the main-side distribution ratio is small, that is, when the distribution of the drive power to the sub driving wheels is relatively large, the upper limit which is used to limit the regenerative torque in regeneration control using the rotary machine which is performed at the time of deceleration of the vehicle is set to a larger value than when the main-side distribution ratio is large. Accordingly, when the distribution of the drive power to the sub driving wheels is large, the regenerative torque can be increased such that the wheels are less likely to slip at the time of performing of the regeneration control than when the distribution of the drive power to the sub driving wheels is small in comparison with a case in which the upper limit is set to a constant value similarly to when the distribution of the drive power to the sub driving wheels is small. In this way, it is possible to increase the regenerative torque depending on the main-side distribution ratio. Accordingly, in the four-wheel-drive vehicle in which the distribution of the drive power to the main driving wheels and the sub driving wheels changes, it is possible to achieve maximization of the regenerative torque of the rotary machine in regeneration control at the time of deceleration of the vehicle.

According to the second aspect, the upper limit of the regenerative torque which does not depend on the main-side distribution ratio is set when it is determined that a control state of the drive power distribution device is not determined, and the upper limit which does not depend on the main-side distribution ratio is set to a value equal to or less than a value which is set when the main-side distribution ratio is large. Accordingly, even when the control state of the drive power distribution device is not determined, it is possible to perform regeneration control while curbing slipping of the wheels.

According to the third aspect, the value which is set when the main-side distribution ratio is large is a value which is set when the four-wheel-drive vehicle is in a two-wheel drive state. Accordingly, even when the control state of the drive power distribution device is not determined, it is possible to appropriately perform regeneration control while curbing slipping of the wheels.

According to the fourth aspect, the upper limit which does not depend on the main-side distribution ratio is set when it is determined that a control state of the drive power distribution device is not determined, and the upper limit is set to a value which is obtained by limiting the upper limit based on the main-side distribution ratio which has been set immediately before it has been determined that the control state of the drive power distribution device is not determined at a predetermined ratio or by subtracting a predetermined value from the upper limit. Accordingly, even when the control state of the drive power distribution device is not determined, it is possible to perform regeneration control while curbing slipping of the wheels.

According to the fifth aspect, the upper limit which does not depend on the main-side distribution ratio is set to a value which is larger when the vehicle speed is low than when the vehicle speed is high. Accordingly, even when the control state of the drive power distribution device is not determined, it is possible to appropriately perform regeneration control while curbing slipping of the wheels.

According to the sixth aspect, when the braking force of the four-wheel-drive vehicle is insufficient for the required braking force due to change of the upper limit of the regenerative torque based on change of the main-side distribution ratio and the wheel brake device is activated, the braking forces of the wheel brakes are applied such that the distribution of the braking force of the four-wheel-drive vehicle applied to the main driving wheels and the sub driving wheels does not change from that before the upper limit of the regenerative torque changed. Accordingly, it is possible to prevent a vehicle posture from changing due to change of the distribution of the braking force of the four-wheel-drive vehicle applied to the main driving wheels and the sub driving wheels with activation of the wheel brake device while curbing the braking force of the four-wheel-drive vehicle being insufficient.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described in detail with reference to the accompanying drawings.

Figure 1:
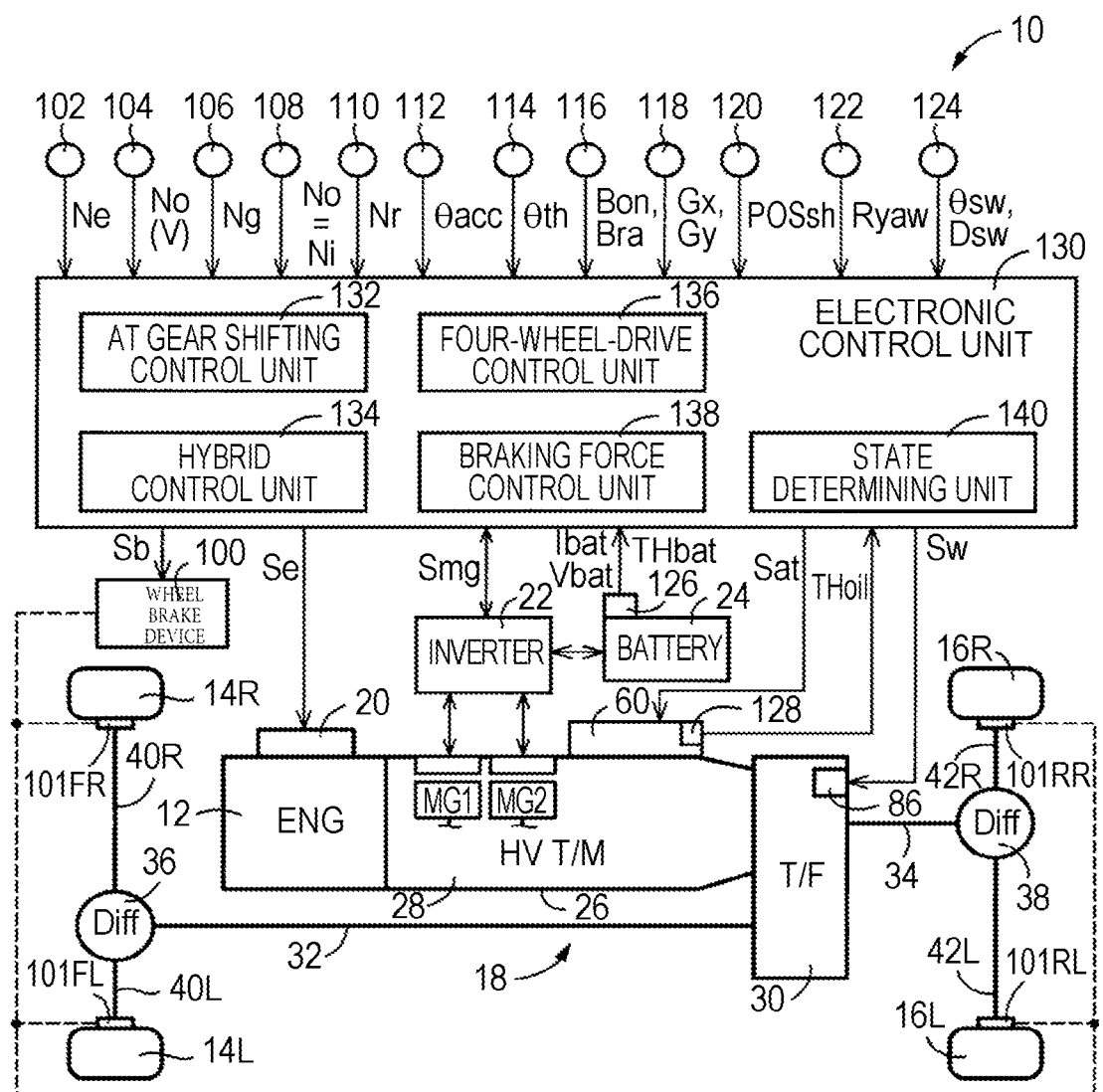
FIG. 1 is a diagram schematically illustrating a configuration of a four-wheel-drive vehicle according to the disclosure and illustrating principal parts of a control function and a control system for various types of control in the four-wheel-drive vehicle.

FIG. 1 is a diagram schematically illustrating a configuration of a four-wheel-drive vehicle 10 according to the disclosure and illustrating principal parts of a control system for various types of control in the four-wheel-drive vehicle 10. In FIG. 1, the four-wheel-drive vehicle 10 is a hybrid vehicle including an engine 12 (see "ENG" in the drawing), a first rotary machine MG1, and a second rotary machine MG2 as drive power sources. The four-wheel-drive vehicle 10 includes a pair of front wheels 14R and 14L on the right and left sides, a pair of rear wheels 16R and 16L on the right and left sides, and a power transmission device 18 that transmits a drive power from the engine 12 or the like to the front wheels 14R and 14L and the rear wheels 16R and 16L. The rear wheels 16R and 16L are main driving wheels which serve as driving wheels in both two-wheel-drive travel and four-wheel-drive travel. The front wheels 14R and 14L are sub driving wheels which serve as driven wheels in two-wheel-drive travel and serve as driving wheels in fourwheel-drive travel. The four-wheel-drive vehicle 10 is a four-wheel-drive vehicle with a front-engine rear-drive (FR) type vehicle as a base. In this embodiment, the front wheels 14R and 14L are referred to as front wheels 14 and the rear wheels 16R and 16L are referred to as rear wheels 16 when they are not particularly distinguished. The engine 12, the first rotary machine MG1, and the second rotary machine MG2 are simply referred to as a drive power source PU when they are not particularly distinguished.

The engine 12 is a drive power source for travel of the four-wheel-drive vehicle 10 and is a known internal combustion engine such as a gasoline engine or a diesel engine. In the engine 12, an engine torque Te which is an output torque of the engine 12 is controlled by causing an electronic control unit 130 which will be described later to control an engine control device 20 including a throttle actuator, a fuel injection device, and an ignition device which are provided in the four-wheel-drive vehicle 10.

The first rotary machine MG1 and the second rotary machine MG2 are electric rotary machines having a function of an electric motor (a motor) and a function of a power generator (a generator) and are so-called motor generators. The first rotary machine MG1 and the second rotary machine MG2 are rotary machines which can serve as drive power sources for travel of the four-wheel-drive vehicle 10. The first rotary machine MG1 and the second rotary machine MG2 are connected to a battery 24 provided in the four-wheel-drive vehicle 10 via an inverter 22 provided in the four-wheel-drive vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 130 which will be described later to control the inverter 22. For example, in the case of positive rotation, an output torque of a rotary machine serves as a powering torque at a positive torque which is an acceleration side and serves as a regenerative torque at a negative torque which is a deceleration side. The battery 24 is a power storage device that transmits and receives electric power to and from the first rotary machine MG1 and the second rotary machine MG2. The first rotary machine MG1 and the second rotary machine MG2 are provided in a case 26 which is a non-rotary member attached to a vehicle body.

The power transmission device 18 includes an automatic transmission 28 (see "HV T/M in the drawing) which is a transmission for a hybrid, a transfer 30 (see "T/F" in the drawing), a front propeller shaft 32, a rear propeller shaft 34, a front-wheel differential gear unit 36 (see "Diff" in the drawing), a rear-wheel differential gear unit 38 (see "Diff" in the drawing), a pair of front-wheel axles 40R and 40L on the right and left sides, and a pair of rear-wheel axles 42R and 42L on the right and left sides. In the power transmission device 18, a drive power from the engine 12 or the like transmitted via the automatic transmission 28 is transmitted from the transfer 30 to the rear wheels 16R and 16L sequentially via the rear propeller shaft 34, the rear-wheel differential gear unit 38, the rear-wheel axles 42R and 42L, and the like. In the power transmission device 18, when some of the drive power from the engine 12 transmitted to the transfer 30 is distributed to the front wheels 14R and 14L side, the distributed drive power is transmitted to the front wheels 14R and 14L sequentially via the front propeller shaft 32, the front-wheel differential gear unit 36, the front-wheel axles 40R and 40L, and the like.

Figures 2, 3:
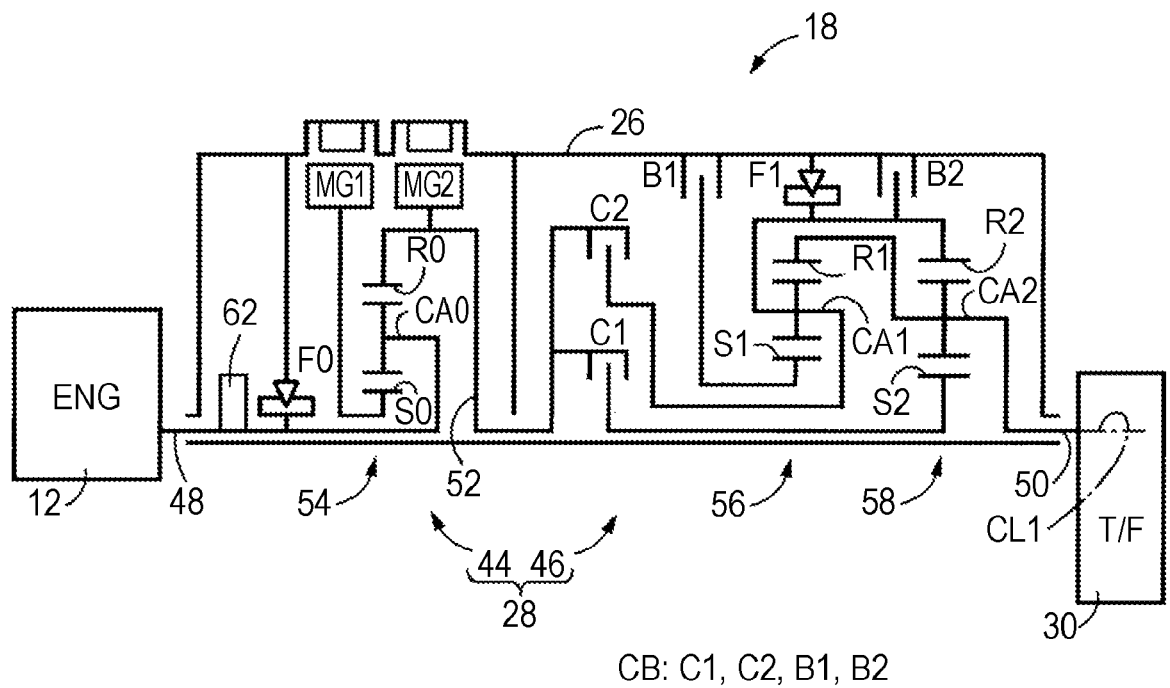
FIG. 2 is a diagram schematically illustrating a configuration of an automatic transmission illustrated in FIG. 1.
FIG. 3 is an operation table illustrating a relationship between a gear shifting operation of a mechanical stepped gear shifting unit illustrated in FIG. 2 and an operation combination of engagement devices which are used therein.

FIG. 2 is a diagram schematically illustrating the configuration of the automatic transmission 28. In FIG. 2, the automatic transmission 28 includes an electrical stepless gear shifting unit 44 and a mechanical stepped gear shifting unit 46 which are arranged in series on a common rotation axis CL1 in the case 26. The electrical stepless gear shifting unit 44 is connected to the engine 12 directly or indirectly via a damper or the like which is not illustrated. The mechanical stepped gear shifting unit 46 is connected to an output side of the electrical stepless gear shifting unit 44. The transfer 30 is connected to an output side of the mechanical stepped gear shifting unit 46. In the automatic transmission 28, power which is output from the engine 12, the second rotary machine MG2, or the like is transmitted to the mechanical stepped gear shifting unit 46 and is then transmitted from the mechanical stepped gear shifting unit 46 to the transfer 30. In the following description, the electrical stepless gear shifting unit 44 is referred to as a stepless gear shifting unit 44 and the mechanical stepped gear shifting unit 46 is referred to as a stepped gear shifting unit 46. Power is synonymous with a torque or a force when they are not particularly distinguished. The stepless gear shifting unit 44 and the stepped gear shifting unit 46 are disposed to be substantially symmetric with respect to the rotation axis CL1, and a lower half with respect to the rotation axis CL1 is not illustrated in FIG. 2. The rotation axis CL1 is an axis of a crankshaft of the engine 12, a connecting shaft 48 which is an input rotary member of the automatic transmission 28 connected to the crankshaft, an output shaft 50 which is an output rotary member of the automatic transmission 28, and the like. The connecting shaft 48 also serves as an input rotary member of the stepless gear shifting unit 44 and the output shaft 50 also serves as an output rotary member of the stepped gear shifting unit 46.

The stepless gear shifting unit 44 includes the first rotary machine MG1 and a differential gear mechanism 54 which is a power split mechanism that mechanically splits power of the engine 12 to the first rotary machine MG1 and an intermediate transmission member 52 which is an output rotary member of the stepless gear shifting unit 44. The second rotary machine MG2 is connected to the intermediate transmission member 52 in a power-transmittable manner. The stepless gear shifting unit 44 is an electrical stepless transmission in which a differential state of the differential gear mechanism 54 is controlled by controlling the operating state of the first rotary machine MG1. The stepless gear shifting unit 44 operates as an electrical stepless transmission in which a gear shifting ratio (also referred to as a gear ratio) γ0 (=engine rotation speed Ne/MG2 rotation speed Nm) changes. The engine rotation speed Ne is a rotation speed of the engine 12 and has the same value as an input rotation speed of the stepless gear shifting unit 44, that is, a rotation speed of the connecting shaft 48. The engine rotation speed Ne is also an input rotation speed of the automatic transmission 28 as a whole including the stepless gear shifting unit 44 and the stepped gear shifting unit 46. The MG2 rotation speed Nm is a rotation speed of the second rotary machine MG2 and has the same value as an output rotation speed of the stepless gear shifting unit 44, that is, a rotation speed of the intermediate transmission member 52. The first rotary machine MG1 is a rotary machine that can control the engine rotation speed Ne. Controlling the operating state of the first rotary machine MG1 corresponds to performing operation control of the first rotary machine MG1.

The differential gear mechanism 54 is constituted by a single-pinion type planetary gear unit and includes a sun gear S0, a carrier CA0, and a ring gear R0. The engine 12 is connected to the carrier CA0 via the connecting shaft 48 in a power-transmittable manner, the first rotary machine MG1 is connected to the sun gear S0 in a power-transmittable manner, and the second rotary machine MG2 is connected to the ring gear R0 in a power-transmittable manner. In the differential gear mechanism 54, the carrier CA0 serves as an input element, the sun gear S0 serves as a reaction element, and the ring gear R0 serves as an output element.

The stepped gear shifting unit 46 is a stepped transmission constituting a power transmission path between the intermediate transmission member 52 and the transfer 30. The intermediate transmission member 52 also serves as an input rotary member of the stepped gear shifting unit 46. The second rotary machine MG2 is connected to the intermediate transmission member 52 such that these rotate together with each other. The stepped gear shifting unit 46 is an automatic transmission constituting a part of a power transmission path between the drive power source PU for travel and the driving wheels (the front wheels 14 and the rear wheels 16). The stepped gear shifting unit 46 is, for example, a known planetary gear type automatic transmission including a plurality of planetary gear units including a first planetary gear unit 56 and a second planetary gear unit 58 and a plurality of engagement devices including a clutch C1, a clutch C2, a brake B1, and a brake B2 in addition to a one-way clutch F1. In the following description, the clutch C1, the clutch C2, the brake B1, and the brake B2 are simply referred to as engagement devices CB when they are not particularly distinguished.

Each engagement device CB is a hydraulic frictional engagement device which is constituted by a multi-disc or single-disc clutch or brake which is pressed by a hydraulic actuator, a band brake which is tightened by the hydraulic actuator, or the like. The operating state such as engagement or disengagement of each engagement device CB is switched by adjusted hydraulic pressures of the engagement devices CB which are output from a hydraulic pressure control circuit 60 (see FIG. 1) provided in the four-wheel-drive vehicle 10.

In the stepped gear shifting unit 46, rotary elements of the first planetary gear unit 56 and the second planetary gear unit 58 are partially connected to each other directly or indirectly via the engagement devices CB or the one-way clutch F1 or are connected to the intermediate transmission member 52, the case 26, or the output shaft 50. The rotary elements of the first planetary gear unit 56 are a sun gear S1, a carrier CA1, and a ring gear R1, and the rotary elements of the second planetary gear unit 58 area a sun gear S2, a carrier CA2, and a ring gear R2.

The stepped gear shifting unit 46 is a stepped transmission in which one gear shifting stage (also referred to as a gear stage) out of a plurality of gear stages with different gear shifting ratios γat (=AT input rotation speed Ni/output rotation speed No) is formed, for example, by engagement of a predetermined engagement device which is one engagement device out of a plurality of engagement devices. That is, gear stages in the stepped gear shifting unit 46 are switched, that is, gear shifting is performed, by engaging one of a plurality of engagement devices. The stepped gear shifting unit 46 is a stepped automatic transmission in which each of a plurality of gear stages is formed. In this embodiment, a gear stage which is formed in the stepped gear shifting unit 46 is referred to as an AT gear stage. The AT input rotation speed Ni is an input rotation speed of the stepped gear shifting unit 46 which is a rotation speed of the input rotary member of the stepped gear shifting unit 46, and has the same value as the rotation speed of the intermediate transmission member 52 and the same value as the MG2 rotation speed Nm. The AT input rotation speed Ni can be expressed by the MG2 rotation speed Nm. The output rotation speed No is a rotation speed of the output shaft 50 which is an output rotation speed of the stepped gear shifting unit 46 and is also an output rotation speed of the automatic transmission 28.

In the stepped gear shifting unit 46, for example, as illustrated in an engagement operation table of FIG. 3, four forward AT gear stages including a first AT gear stage ("$1^{st}$" in the drawing) to a fourth AT gear stage ("$4^{th}$" in the drawing) are formed as the plurality of AT gear stages. The gear ratio γat of the first AT gear stage is the highest and the gear ratio γat becomes lower as the AT gear stage becomes higher. A reverse AT gear stage ("Rev" in the drawing) is formed, for example, by engagement of the clutch C1 and engagement of the brake B2. That is, for example, the first AT gear stage is formed at the time of reverse travel. The engagement operation table illustrated in FIG. 3 is obtained by collecting relationships between the AT gear stages and the operation states of the plurality of engagement devices. That is, the engagement operation table illustrated in FIG. 3 is obtained by collecting relationships between the AT gear stages and predetermined engagement devices which are engagement devices engaged in the corresponding AT gear stages. In FIG. 3, "0" denotes engagement, "A" denotes engagement at the time of engine braking or at the time of coasting downshift of the stepped gear shifting unit 46, and a blank denotes disengagement.

In the stepped gear shifting unit 46, an AT gear stage which is formed according to a driver's operation of an accelerator, a vehicle speed V, or the like is switched, that is, a plurality of AT gear stages is selectively formed, by the electronic control unit 130 which will be described later. For example, in gear shifting control of the stepped gear shifting unit 46, so-called clutch-to-clutch gear shifting in which gear shifting is performed by switching one of the engagement devices CB, that is, gear shifting is performed by switching of the engagement devices CB between engagement and disengagement, is performed.

The four-wheel-drive vehicle 10 further includes, for example, a one-way clutch F0, an MOP 62 which is a mechanical oil pump, and an electric oil pump which is not illustrated.

The one-way clutch F0 is a lock mechanism that can fix the carrier CA0 such that it cannot rotate. That is, the one-way clutch F0 is a lock mechanism that can fix the connecting shaft 48 which is connected to the crankshaft of the engine 12 and which rotates integrally with the carrier CA0 to the case 26. In the one-way clutch F0, one member of two members that are rotatable relative to each other is integrally connected to the connecting shaft 48 and the other member is integrally connected to the case 26. The one-way clutch F0 idles in a positive rotating direction which is a rotating direction at the time of operation of the engine 12 and is automatically mechanically engaged in a rotating direction which is opposite to that at the time of operation of the engine 12. Accordingly, at the time of idling of the one-way clutch F0, the engine 12 is rotatable relative to the case 26. On the other hand, at the time of engagement of the one-way clutch F0, the engine 12 is not rotatable relative to the case 26. That is, the engine 12 is fixed to the case 26 by engagement of the one-way clutch F0. In this way, the one-way clutch F0 permits rotation in the positive rotating direction of the carrier CA0 which is a rotating direction at the time of operation of the engine 12 and prohibits rotation in the negative rotating direction of the carrier CA0. That is, the one-way clutch F0 is a lock mechanism that can permit rotation in the positive rotating direction of the engine 12 and prohibit rotation in the negative rotating direction.

The MOP 62 is connected to the connecting shaft 48, and rotates with rotation of the engine 12 to eject a hydraulic oil which is used for the power transmission device 18. The electric oil pump which is not illustrated is driven, for example, when the engine 12 is stopped, that is, when the MOP 62 is not driven. The hydraulic oil which is ejected by the MOP 62 or the electric oil pump which is not illustrated is supplied to the hydraulic pressure control circuit 60. The operation states of the engagement devices CB are switched by the hydraulic pressures adjusted by the hydraulic pressure control circuit based on the hydraulic oil.

Figure 4:
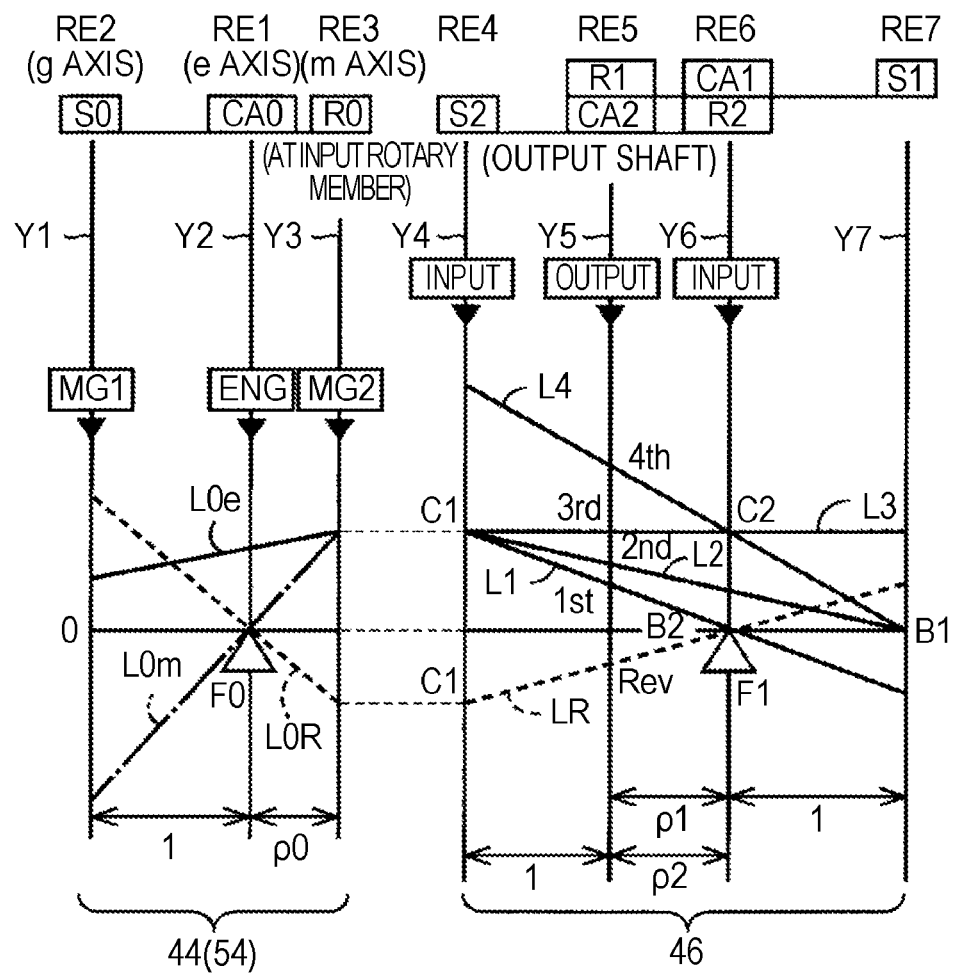
FIG. 4 is a collinear diagram illustrating a relative relationship between rotation speeds of rotary elements in an electrical stepless gear shifting unit and the mechanical stepped gear shifting unit illustrated in FIG. 2.

FIG. 4 is a collinear diagram illustrating a relative relationship between rotation speeds of the rotary elements in the stepless gear shifting unit 44 and the stepped gear shifting unit 46. In FIG. 4, three vertical lines Y1, Y2, and Y3 corresponding to three rotary elements of the differential gear mechanism 54 constituting the stepless gear shifting unit 44 are a g axis indicating the rotation speed of the sun gear S0 corresponding to a second rotary element RE2, an e axis indicating the rotation speed of the carrier CA0 corresponding to a first rotary element RE1, and an m axis indicating the rotation speed of the ring gear R0 (that is, the input rotation speed of the stepped gear shifting unit 46) corresponding to a third rotary element RE3, respectively, sequentially from the left side. Four vertical lines Y4, Y5, Y6, and Y7 of the stepped gear shifting unit 46 are axes indicating the rotation speed of the sun gear S2 corresponding to a fourth rotary element RE4, the rotation speed of the ring gear R1 and the carrier CA2 (that is, the rotation speed of the output shaft 50) connected to each other and corresponding to a fifth rotary element RE5, the rotation speed of the carrier CA1 and the ring gear R2 connected to each other and corresponding to a sixth rotary element RE6, and the rotation speed of the sun gear S1 corresponding to a seventh rotary element RE7, respectively, sequentially from the left side. The gaps between the vertical lines Y1, Y2, and Y3 are determined according to a gear ratio $\rho 0$ of the differential gear mechanism 54. The gaps between the vertical lines Y4, Y5, Y6, and Y7 are determined according to gear ratios $\rho 1$ and $\rho 2$ of the first and second planetary gear units 56 and 58. In the relationship between the vertical axes in the collinear diagram, when the gap between a sun gear and a carrier corresponds to "1," the gap between the carrier and a ring gear corresponds to a gear ratio $\rho$ of a planetary gear unit (=number of teeth of the sun gear/number of teeth of the ring gear).

With reference to the collinear diagram illustrated in FIG. 4, in the differential gear mechanism 54 of the stepless gear shifting unit 44, the engine 12 (see "ENG" in the drawing) is connected to the first rotary element RE1, the first rotary machine MG1 (see "MG1" in the drawing) is connected to the second rotary element RE2, the second rotary machine MG2 (see "MG2" in the drawing) is connected to the third rotary element RE3 which rotates integrally with the intermediate transmission member 52, and the rotation of the engine 12 is transmitted to the stepped gear shifting unit 46 via the intermediate transmission member 52. In the stepless gear shifting unit 44, a relationship between the rotation speed of the sun gear S0 and the rotation speed of the ring gear R0 is represented by straight lines L0e, L0m, and L0R crossing the vertical line Y2.

In the stepped gear shifting unit 46, the fourth rotary element RE4 is selectively connected to the intermediate transmission member 52 via the clutch C1, the fifth rotary element RE5 is connected to the output shaft 50, the sixth rotary element RE6 is selectively connected to the intermediate transmission member 52 via the clutch C2 and selectively connected to the case 26 via the brake B2, and the seventh rotary element RE7 is selectively connected to the case 26 via the brake B1 In the stepped gear shifting unit 46, the rotation speeds "1st," "2nd," "3rd," "4th," and "Rev" in the output shaft 50 are denoted by straight lines L1, L2, L3, L4, and LR crossing the vertical line Y5 through engagement/disengagement control of the engagement devices CB.

The straight line L0e and the straight lines L1, L2, L3, and L4 which are indicated by solid lines in FIG. 4 denote relative speeds of the rotary elements at the time of forward travel in a hybrid travel (=HV travel) mode in which HV travel using at least the engine 12 as a drive power source is possible. In the HV travel mode, in the differential gear mechanism 54, when an MG1 torque Tg which is a reaction torque is input to the sun gear S0 as a negative torque of the first rotary machine MG1 with respect to an engine torque Te which is a positive torque input to the carrier CA0, a direct engine-transmitted torque Td $(=Te/(1+\rho 0)=-(1/\rho 0)\times Tg)$ which is a positive torque at the time of positive rotation appears in the ring gear R0. A combined torque of the direct engine-transmitted torque Td and the MG2 torque Tm is transmitted as a drive torque in the forward direction of the four-wheel-drive vehicle 10 to the transfer 30 via the stepped gear shifting unit 46 in which one AT gear stage out of the first AT gear stage to the fourth AT gear stage is formed according to a required drive power. The first rotary machine MG1 serves as a power generator when a negative torque is generated at the time of positive rotation. A generated electric power Wg of the first rotary machine MG1 charges the battery 24 or is consumed in the second rotary machine MG2. The second rotary machine MG2 outputs the MG2 torque Tm using all or some of the generated electric power Wg or electric power from the battery 24 in addition to the generated electric power Wg.

The straight line L0m indicated by an alternate long and short dash line in FIG. 4 and the straight lines L1, L2, L3, and L4 indicated by solid lines in FIG. 4 denote relative speeds of the rotary elements at the time of forward travel in a motor-driven travel (=EV travel) mode in which EV travel using at least one rotary machine of the first rotary machine MG1 and the second rotary machine MG2 as a drive power source in a state in which the operation of the engine 12 is stopped is possible. The EV travel at the time of forward travel in the EV travel mode includes, for example, single-motor-driven EV travel using only the second rotary machine MG2 as a drive power source and two-motor-driven travel using both the first rotary machine MG1 and the second rotary machine MG2 as drive power sources. In the single-motor-driven EV travel, the carrier CA0 does not rotate and the MG2 torque Tm which is a positive torque at the time of positive rotation is input to the ring gear R0. At this time, the first rotary machine MG1 connected to the sun gear S0 enters a no-load state and idles at the time of negative rotation. In the single-motor-driven EV travel, the one-way clutch F0 is disengaged and the connecting shaft 48 is not fixed to the case 26.

In the two-motor-driven EV travel, when the MG1 torque Tg which is a negative torque at the time of negative rotation is input to the sun gear S0 in a state in which the carrier CA0 does not rotate, the one-way clutch F0 is automatically engaged such that rotation in the negative rotating direction of the carrier CA0 is prohibited. In the state in which the carrier CA0 is fixed not to be rotatable by engagement of the one-way clutch F0, a reaction torque based on the MG1 torque Tg is input to the ring gear R0. In the two-motordriven EV travel, similarly to the single-motor-driven EV travel, the MG2 torque Tm is input to the ring gear R0. When the MG1 torque Tg which is a negative torque at the time of negative rotation is input to the sun gear S0 in a state in which the carrier CA0 does not rotate and the MG2 torque Tm is not input thereto, the single-motor-driven EV travel using the MG1 torque Tg is also possible. At the time of forward travel in the EV travel mode, the engine 12 is not driven, the engine rotation speed Ne is zero, and at least one torque of the MG1 torque Tg and the MG2 torque Tm is transmitted as a drive torque in the forward direction of the four-wheel-drive vehicle 10 to the transfer 30 via the stepped gear shifting unit 46 in which one AT gear stage out of the first to fourth AT gear stages is formed. At the time of forward travel in the EV travel mode, the MG1 torque Tg is a powering torque which is a negative torque for negative rotation and the MG2 torque Tm is a powering torque which is a positive torque for positive rotation.

The straight line L0R and the straight line LR indicated by dotted lines in FIG. 4 denote relative speeds of the rotary elements at the time of reverse travel in the EV travel mode. At the time of reverse travel in the EV travel mode, the MG2 torque Tm which is a negative torque at the time of negative rotation is input to the ring gear R0 and the MG2 torque Tm is transmitted as a drive torque in the reverse travel direction of the four-wheel-drive vehicle 10 to the transfer 30 via the stepped gear shifting unit 46 in which the first AT gear stage is formed. In the four-wheel-drive vehicle 10, by outputting the MG2 torque Tm for reverse travel of which the sign is opposite to that of the MG2 torque Tm for forward travel at the time of forward travel from the second rotary machine MG2, for example, in a state in which the first AT gear stage which is a low-side AT gear stage for forward travel out of a plurality of AT gear stages is formed by the electronic control unit 130 which will be described later, it is possible to perform reverse travel. At the time of reverse travel in the EV travel mode, the MG2 torque Tm is a powering torque which is a negative torque for negative rotation. In the HV travel mode, since the second rotary machine MG2 can be negatively rotated as indicated by the straight line L0R, it is possible to perform reverse travel similarly to the EV travel mode.

Figure 5:
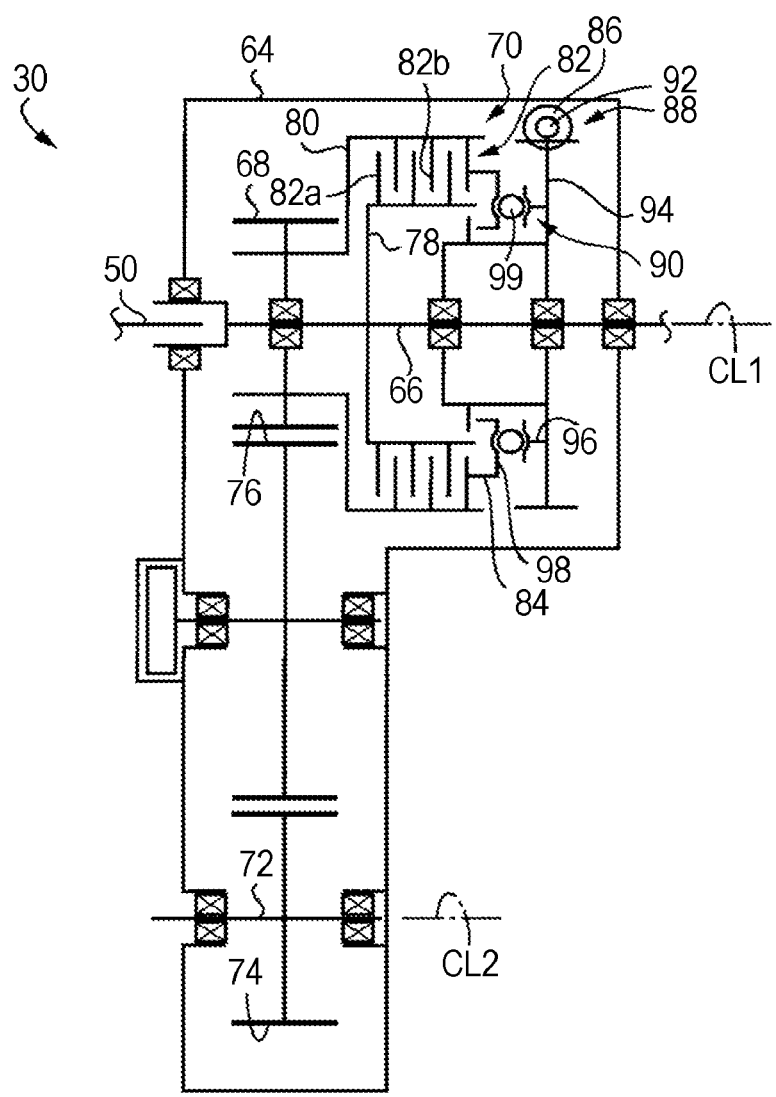
FIG. 5 is a skeleton diagram illustrating a structure of a transfer illustrated in FIG. 1.

FIG. 5 is a skeleton diagram illustrating the structure of the transfer 30. The transfer 30 includes a transfer case 64 which is a non-rotary member. The transfer 30 includes a rear-wheel output shaft 66, a front-wheel-driving drive gear 68, and a front-wheel-driving clutch 70 in the transfer case 64 with respect to a common rotation axis CL1. The transfer 30 includes a front-wheel output shaft 72 and a front-wheel-driving driven gear 74 in the transfer case 64 with respect to a common rotation axis CL2. The transfer 30 further includes a front-wheel-driving idler gear 76. The rotation axis CL2 is an axis of the front propeller shaft 32, the front-wheel output shaft 72, and the like.

The rear-wheel output shaft 66 is connected to the output shaft 50 in a power-transmittable manner and is connected to the rear propeller shaft 34 in a power-transmittable manner. The rear-wheel output shaft 66 outputs a drive power transmitted from the drive power source PU to the output shaft 50 via the automatic transmission 28 to the rear wheels 16. The output shaft 50 also serves as the input rotary member of the transfer 30 that inputs the drive power from the drive power source PU to the rear-wheel output shaft 66 of the transfer 30, that is, a drive power transmission shaft that transmits the drive power from the drive power source PU to the transfer 30. The automatic transmission 28 is an automatic transmission that transmits the drive power from the drive power source PU to the output shaft 50.

The front-wheel-driving drive gear 68 is provided to be rotatable relative to the rear-wheel output shaft 66. The front-wheel-driving clutch 70 is a multi-disc wet clutch and adjusts a transmission torque that is transmitted from the rear-wheel output shaft 66 to the front-wheel-driving drive gear 68. That is, the front-wheel-driving clutch 70 adjusts a transmission torque that is transmitted from the rear-wheel output shaft 66 to the front-wheel output shaft 72.

The front-wheel-driving driven gear 74 is provided integrally with the front-wheel output shaft 72 and is connected to the front-wheel output shaft 72 in a power-transmittable manner. The front-wheel-driving idler gear 76 engages with the front-wheel-driving drive gear 68 and the front-wheel-driving driven gear 74 and connects the front-wheel-driving drive gear 68 and the front-wheel-driving driven gear 74 in a power-transmittable manner.

The front-wheel output shaft 72 is connected to the front-wheel-driving drive gear 68 via the front-wheel-driving idler gear 76 and the front-wheel-driving driven gear 74 in a power-transmittable manner and is connected to the front propeller shaft 32 in a power-transmittable manner. The front-wheel output shaft 72 outputs some of the drive power from the drive power source PU transmitted to the front-wheel-driving drive gear 68 via the front-wheel-driving clutch 70 to the front wheels 14.

The front-wheel-driving clutch 70 includes a clutch hub 78, a clutch drum a frictional engagement element 82, and a piston 84. The clutch hub 78 is connected to the rear-wheel output shaft 66 in a power-transmittable manner. The clutch drum 80 is connected to the front-wheel-driving drive gear 68 in a power-transmittable manner. The frictional engagement element 82 includes a plurality of first frictional plates 82a that is provided to be movable in the direction of the rotation axis CL1 relative to the clutch hub 78 and to be non-rotatable relative to the clutch hub 78 and a plurality of second frictional plates 82b that is provided to be movable in the direction of the rotation axis CL1 relative to the clutch drum 80 and to be non-rotatable relative to the clutch drum 80. The first frictional plates 82a and the second frictional plates 82b are arranged to overlap alternately in the direction of the rotation axis CL1. The piston 84 is provided to be movable in the direction of the rotation axis CL1 and comes into contact with the frictional engagement element 82 to press the first frictional plates 82a and the second frictional plates 82b such that a torque capacity of the front-wheel-driving clutch 70 is adjusted. When the piston 84 does not press the frictional engagement element 82, the torque capacity of the front-wheel-driving clutch 70 becomes zero and the front-wheel-driving clutch 70 is disengaged.

The transfer 30 distributes the drive power of the drive power source PU transmitted via the automatic transmission 28 to the rear-wheel output shaft 66 and the front-wheel output shaft 72 by adjusting the torque capacity of the front-wheel-driving clutch 70. When the front-wheel-driving clutch 70 is disengaged, the power transmission path between the rear-wheel output shaft 66 and the front-wheel-driving drive gear 68 is cut off and thus the transfer 30 transmits the drive power transmitted from the drive power source PU to the transfer 30 via the automatic transmission 28 to the rear wheels 16 via the rear propeller shaft 34 and the like. When the front-wheel-driving clutch 70 is in a slipping engaged state or a fully engaged state, the power transmission path between the rear-wheel output shaft 66 and the front-wheel-driving drive gear 68 is set up and thus the transfer 30 transmits some of the drive power transmitted from the drive power source PU via the transfer 30 to the front wheels 14 via the front propeller shaft 32 and the like and transmits the remaining drive power to the rear wheels 16 via the rear propeller shaft 34 and the like. The transfer 30 is a drive power distribution device that can transmit the drive power from the drive power source PU to the front wheels 14 and the rear wheels 16.

The transfer 30 includes an electric motor 86, a worm gear 88, and a cam mechanism 90 as a device that operates the front-wheel-driving clutch 70.

The worm gear 88 is a gear pair including a worm 92 that is formed integrally with a motor shaft of the electric motor 86 and a worm wheel 94 in which teeth engaging with the worm 92 are formed. The worm wheel 94 is provided to be rotatable about the rotation axis CL1. When the electric motor 86 rotates, the worm wheel 94 rotates about the rotation axis CL1.

The cam mechanism 90 is provided between the worm wheel 94 and the piston 84 of the front-wheel-driving clutch 70. The cam mechanism 90 is a mechanism that includes a first member 96 that is connected to the worm wheel 94, a second member 98 that is connected to the piston 84, and a plurality of balls 99 that is inserted between the first member 96 and the second member 98 and converts a rotational motion of the electric motor 86 to a translational motion.

The plurality of balls 99 is arranged at intervals of a constant angle in the rotating direction about the rotation axis CL1. Cam grooves are formed on the surfaces of the first member 96 and the second member 98 in contact with the balls 99. Each cam groove is formed such that the first member 96 and the second member 98 are separated from each other in the direction of the rotation axis CL1 when the first member 96 rotates relatively to the second member 98. Accordingly, when the first member 96 rotates relatively to the second member 98, the first member 96 and the second member 98 are separated from each other, the second member 98 moves in the direction of the rotation axis CL1, and the piston 84 connected to the second member 98 presses the frictional engagement element 82. When the worm wheel 94 is rotated by the electric motor 86, the rotational motion of the worm wheel 94 is converted into a translational motion in the direction of the rotation axis CL1 via the cam mechanism 90 and is transmitted to the piston 84, and the piston 84 presses the frictional engagement element 82. By adjusting a pressing force causing the piston 84 to press the frictional engagement element 82, the torque capacity of the front-wheel-driving clutch 70 is adjusted. By adjusting the torque capacity of the front-wheel-driving clutch 70, the transfer 30 can adjust a ratio at which the drive power from the drive power source PU is distributed to the front wheels 14 and the rear wheels 16.

The ratio of the drive power from the drive power source PU which is distributed to the front wheels 14 and the rear wheels 16 is, for example, a ratio of the drive power transmitted to the rear wheels 16 to the total drive power transmitted from the drive power source PU to the rear wheels 16 and the front wheels 14, that is, a rear-wheel distribution ratio Xr. Alternatively, the ratio of the drive power from the drive power source PU which is distributed to the front wheels 14 and the rear wheels 16 is, for example, a ratio of the drive power transmitted to the front wheels 14 to the total drive power transmitted from the drive power source PU to the rear wheels 16 and the front wheels 14, that is a front-wheel distribution ratio Xf (=1−Xr). In this embodiment, since the rear wheels 16 are main driving wheels, the rear-wheel distribution ratio Xr is a main-side distribution ratio.

When the piston 84 does not press the frictional engagement element 82, the torque capacity of the front-wheel-driving clutch 70 is zero. At this time, the front-wheel-driving clutch 70 is disengaged and the rear-wheel distribution ratio Xr is 1.0. In other words, when the distribution of the drive power to the front wheels 14 and the rear wheels 16, that is, a drive power distribution of the front and rear wheels, is expressed as "drive power of the front wheels 14:drive power of rear wheels 16" with the total drive power as 100, the drive power distribution of the front and rear wheels is 0:100. On the other hand, when the piston 84 presses the frictional engagement element 82, the torque capacity of the front-wheel-driving clutch 70 becomes greater than zero and the rear-wheel distribution ratio Xr decreases as the torque capacity of the front-wheel-driving clutch 70 increases. At the torque capacity with which the front-wheel-driving clutch 70 is fully engaged, the rear-wheel distribution ratio Xr is 0.5. In other words, the drive power distribution of the front and rear wheels is balanced at 50:50. In this way, by adjusting the torque capacity of the front-wheel-driving clutch 70, the transfer 30 can adjust the rear-wheel distribution ratio Xr between 1.0 and 0.5, that is, between 0:100 and 50:50.

Referring back to FIG. 1, the four-wheel-drive vehicle 10 includes a wheel brake device 100. The wheel brake device 100 includes a wheel brake 101 and a brake master cylinder which is not illustrated, and applies a braking force based on the wheel brake 101 to the wheels 14 and 16 such as the front wheels 14 and the rear wheels 16. The wheel brake 101 includes front brakes 101FR and 101FL that are provided in the front wheels 14R and 14L and rear brakes 101RR and 101RL that are provided in the rear wheels 16R and 16L. The wheel brake device 100 supplies a brake oil pressure to wheel cylinders (not illustrated) that are provided in the wheel brakes 101, for example, according to a driver's operation of depressing a brake pedal or the like. In the wheel brake device 100, in a normal state, a master cylinder oil pressure which has a magnitude corresponding to a brake operation amount Bra and which is generated from the brake master cylinder is supplied to the wheel cylinders as the brake oil pressure. On the other hand, in the wheel brake device 100, for example, at the time of ABS control, at the time of sideslip suppression control, and at the time of vehicle speed control, the brake oil pressure required for the individual types of control is supplied to the wheel cylinders to generate a braking force from the wheel brakes 101. The brake operation amount Bra is a signal indicating the magnitude of a driver's operation of depressing the brake pedal, which corresponds to a force with which the driver depresses the brake pedal. In this way, the wheel brake device 100 can adjust the braking forces from the wheel brakes 101 which are applied to the wheels 14 and 16.

The four-wheel-drive vehicle 10 includes an electronic control unit 130 which is a controller including a control device for the four-wheel-drive vehicle 10 that controls the driver power source PU, the transfer 30, and the like. FIG. 1 is a diagram illustrating an input and output system of the electronic control unit 130 and is a functional block diagram illustrating a principal part of the control function of the electronic control unit 130. The electronic control unit 130 is configured to include a so-called microcomputer including a CPU, a RAM, a ROM, and an input/output interface, and the CPU performs various types of control of the four-wheel-drive vehicle 10 by performing signal processing in accordance with a program which is stored in the ROM in advance using a temporary storage function of the RAM.

The electronic control unit 130 may include a computer for engine control and a computer for gear shifting control according to necessity.

Various signals (for example, an engine rotation speed Ne, an output rotation speed No corresponding to a vehicle speed V, an MG1 rotation speed Ng which is the rotation speed of the first rotary machine MG1, an MG2 rotation speed Nm which has the same value as the AT input rotation speed Ni, wheel speeds Nr which are rotation speeds of the wheels 14 and 16, an accelerator operation amount θacc which is a driver's amount of operation of an accelerator pedal indicating the magnitude of the driver's accelerating operation, a throttle valve opening θth which is an opening of an electronic throttle valve, a brake-on signal Bon which is a signal indicating a state in which the brake pedal for operating the wheel brakes 101 is operated by the driver, a brake operation amount Bra, longitudinal acceleration Gx and lateral acceleration Gy of the four-wheel-drive vehicle 10, an operation position POSsh of a shift lever provided in the four-wheel-drive vehicle 10, a yaw rate Ryaw which is a rotational angular velocity around a vertical axis of the four-wheel-drive vehicle 10, a steering angle θsw and a steering direction Dsw of a steering wheel provided in the four-wheel-drive vehicle 10, a battery temperature THbat, a battery charging/discharging current Ibat, or a battery voltage Vbat of the battery 24, and a hydraulic oil temperature THoil which is the temperature of a hydraulic oil OIL) based on detection values from various sensors (for example, an engine rotation speed sensor 102, an output rotation speed sensor 104, an MG1 rotation speed sensor 106, an MG2 rotation speed sensor 108, wheel speed sensors 110 provided in the wheels 14 and 16, an accelerator operation amount sensor 112, a throttle valve opening sensor 114, a brake pedal sensor 116, a G sensor 118, a shift position sensor 120, a yaw rate sensor 122, a steering sensor 124, a battery sensor 126, and an oil temperature sensor 128) provided in the four-wheel-drive vehicle 10 are supplied to the electronic control unit 130.

Various command signals (for example, an engine control command signal Se for controlling the engine 12, rotary machine control command signals Smg for controlling the first rotary machine MG1 and the second rotary machine MG2, hydraulic pressure control command signals Sat for controlling operating states of the engagement devices CB, an electric motor control command signal Sw for controlling the electric motor 86, and a brake control command signal Sb for controlling the braking force from the wheel brake 101) are output from the electronic control unit 130 to various devices (for example, the engine control device 20, the inverter 22, the hydraulic pressure control circuit 60, the electric motor 86, and the wheel brake device 100) provided in the four-wheel-drive vehicle 10.

In order to realize various types of control in the four-wheel-drive vehicle 10 the electronic control unit 130 includes an AT gear shifting control means, that is, an AT gear shifting control unit 132, a hybrid control means, that is, a hybrid control unit 134, a four-wheel-drive control means, that is, a four-wheel-drive control unit 136, and a braking force control means, that is, a braking force control unit 138.

Figure 6:
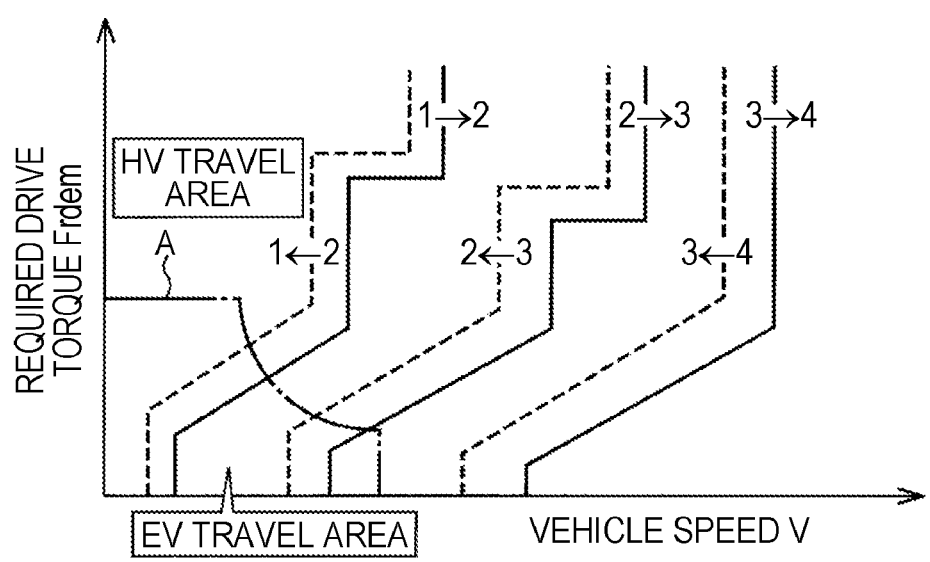
FIG. 6 is a diagram illustrating an example of an AT gear stage shifting map which is used for control of gear shifting of a stepped gear shifting unit and a travel mode switching map which is used for control of switching of a travel mode and illustrating a relationship therebetween.

The AT gear shifting control unit 132 performs gear shifting determination of the stepped gear shifting unit 46, for example, using an AT gear stage shifting map illustrated in FIG. 6 which is a relationship which has been calculated and stored in advance by experiment or design, that is, a predetermined relationship, and outputs the hydraulic pressure control command signal Sat for performing gear shifting control of the stepped gear shifting unit 46 to the hydraulic pressure control circuit 60 according to necessity. The AT gear stage shifting map is, for example, a predetermined relationship with gear shift lines which are used to determine gear shifting of the stepped gear shifting unit 46 on a two-dimensional coordinate system with the vehicle speed V and the required drive power Frdem as variables. Here, the output rotation speed No or the like may be used instead of the vehicle speed V. A required drive torque Trdem, an accelerator operation amount θacc, a throttle valve opening θth, or the like may be used instead of the required drive power Frdem. The gear shift lines in the AT gear stage shifting map include upshift lines for determining an upshift as indicated by solid lines and downshift lines for determining a downshift as indicated by dotted lines.

The hybrid control unit 134 has a function of an engine control means, that is, an engine control unit, that controls the operation of the engine 12 and a function of a rotary machine control means, that is, a rotary machine control unit, that controls the operations of the first rotary machine MG1 and the second rotary machine MG2 via the inverter 22, and performs hybrid drive control or the like using the engine 12, the first rotary machine MG1, and the second rotary machine MG2 based on the control functions.

The hybrid control unit 134 calculates the required drive power Frdem which is a required drive amount, for example, by applying the accelerator operation amount θacc and the vehicle speed V to a required drive amount map which is a predetermined relationship. As the required drive amount, the required drive torque Trdem [Nm] in each driving wheel (the front wheels 14 and the rear wheels 16), the required drive power Prdem [W] in each driving wheel, a required AT output torque in the output shaft 50, or the like may be used in addition to the required drive power Frdem [N]. The hybrid control unit 134 outputs the engine control command signal Se which is a command signal for controlling the engine 12 and the rotary machine control command signals Smg which are command signals for controlling the first rotary machine MG1 and the second rotary machine MG2 in order to realize the required drive power Prdem based on the required drive torque Trdem and the vehicle speed V in consideration of chargeable electric power Win and dischargeable electric power Wout of the battery 24 or the like. The engine control command signal Se is, for example, a command value for an engine power Pe which is the power of the engine 12 for outputting the engine torque Te at the engine rotation speed Ne at that time. The rotary machine control command signal Smg is, for example, a command value for the generated electric power Wg of the first rotary machine MG1 for outputting the MG1 torque Tg at the MG1 rotation speed Ng at the time of outputting of a command as a reaction torque of the engine torque Te and a command value for power consumption Wm of the second rotary machine MG2 for outputting the MG2 torque Tm at the MG2 rotation speed Nm at the time of outputting of a command.

The chargeable electric power Win of the battery 24 is possible input electric power for defining limitation of input electric power of the battery 24 and the dischargeable electric power Wout of the battery 24 is possible output electric power for defining limitation of output electric power of the battery 24. The chargeable electric power Win or the dischargeable electric power Wout of the battery 24 is calculated, for example, based on a state of charge value SOC [%] corresponding to the battery temperature THbat and an amount of electric power charged in the battery 24 by the electronic control unit 130. The state of charge value SOC of the battery 24 is a value indicating a state of charge of the battery 24 and is calculated, for example, based on the battery charging/discharging current that and the battery voltage Vbat by the electronic control unit 130.

For example, when the stepless gear shifting unit 44 operates as a stepless transmission and the automatic transmission 28 operates as a stepless transmission as a whole, the hybrid control unit 134 performs stepless gear shifting control of the stepless gear shifting unit 44 to change the gear ratio γ0 of the stepless gear shifting unit 44 by controlling the engine 12 and controlling the generated electric power Wg of the first rotary machine MG1 such that the engine rotation speed Ne or the engine torque Te with which the engine power Pe for realizing the required drive power Prdem is obtained is achieved in consideration of an optimal engine operating point or the like. As a result of this control, the gear ratio γt(=γ0×γat=Ne/No) of the automatic transmission 28 at the time of operating as a stepless transmission is controlled. The optimal engine operating point is predetermined as an engine operating point at which total fuel efficiency in the four-wheel-drive vehicle 10 is the best in consideration of charging/discharging efficiency or the like in the battery 24 in addition to fuel efficiency of the engine 12 alone, for example, when the required engine power Pedem is realized. This engine operating point is an operating point of the engine 12 which is expressed by the engine rotation speed Ne and the engine torque Te.

For example, when the stepless gear shifting unit 44 is shifted like a stepped transmission and the automatic transmission 28 is shifted like a stepped transmission as a whole, the hybrid control unit 134 performs gear shifting determination of the automatic transmission 28, for example, using a stepped gear shifting map which is a predetermined relationship and performs gear shifting control of the stepless gear shifting unit 44 such that a plurality of gear stages with different gear ratios γt is selectively formed in cooperation with gear shifting control of the AT gear stages of the stepped gear shifting unit 46 which is performed by the AT gear shifting control unit 132. Each of the plurality of gear stages can be formed by controlling the engine rotation speed Ne using the first rotary machine MG1 according to the output rotation speed No such that the corresponding gear ratio γt can be maintained.

The hybrid control unit 134 selectively establishes an EV travel mode or an HV travel mode as a travel mode according to a travel state. For example, the hybrid control unit 134 establishes the EV travel mode when the required drive power Prdem is in an EV travel area less than a predetermined threshold value, and establishes the HV travel mode when the required drive power Prdem is in an HV travel area equal to or greater than the predetermined threshold value. An alternate long and short dash line A in FIG. 6 denotes a boundary line between the HV travel area and the EV travel area for switching between the HV travel mode and the EV travel mode. A predetermined relationship including the boundary line indicated by the alternate long and short dash line A in FIG. 6 is an example of a travel mode switching map plotted in a two-dimensional coordinate system with the vehicle speed V and the required drive power Frdem as variables. In FIG. 6, for the purpose of convenience, the travel mode switching map is illustrated together with the AT gear stage shifting map.

When the EV travel mode is established and the required drive power Prdem can be realized using only the second rotary machine MG2, the hybrid control unit 134 causes the four-wheel-drive vehicle 10 to travel by single-motor-driven EV travel using the second rotary machine MG2. On the other hand, when the EV travel mode is established and the required drive power Prdem cannot be realized using only the second rotary machine MG2, the hybrid control unit 134 causes the four-wheel-drive vehicle 10 to travel by two-motor-driven EV travel. When the required drive power Prdem can be realized using only the second rotary machine MG2 but efficiency in the case in which the first rotary machine MG1 and the second rotary machine MG2 are used together is better than that in the case in which only the second rotary machine MG2 is used, the hybrid control unit 134 may cause the four-wheel-drive vehicle 10 to travel by two-motor-driven EV travel.

When the required drive power Prdem is in the EV travel area and when the state of charge value SOC of the battery 24 is less than a predetermined engine-starting threshold value or when warming-up of the engine 12 is necessary, the hybrid control unit 134 establishes the HV travel mode. The engine-starting threshold value is a predetermined threshold value for determining a state of charge value SOC with which the engine 12 needs to be forcibly started to charge the battery 24.

When the operation of the engine 12 is stopped and the HV travel mode is established, the hybrid control unit 134 performs engine start control for starting the engine 12. At the time of starting of the engine 12, the hybrid control unit 134 starts the engine 12, for example, by performing ignition when the engine rotation speed Ne is equal to or greater than a predetermined ignitable rotation speed in which ignition is possible while increasing the engine rotation speed Ne using the first rotary machine MG1. That is, the hybrid control unit 134 starts the engine 12 by cranking the engine 12 using the first rotary machine MG1.

The four-wheel-drive control unit 136 controls the rear-wheel distribution ratio Xr. The four-wheel-drive control unit 136 sets a target value of the rear-wheel distribution ratio Xr based on the travel state of the four-wheel-drive vehicle 10 which is determined from the output rotation speed sensor 104, the G sensor 118, or the like and outputs the electric motor control command signal Sw for controlling the electric motor 86 such that the rear-wheel distribution ratio Xr is adjusted to the target value by adjusting the torque capacity of the front-wheel-driving clutch 70.

The four-wheel-drive control unit 136 controls the rear-wheel distribution ratio Xr such that it becomes 1.0 (that is, the drive power distribution of the front and rear wheels is 0:100), for example, by disengaging the front-wheel-driving clutch 70 at the time of forward travel. The four-wheel-drive control unit 136 calculates a target yaw rate Ryawtgt based on the steering angle θsw, the vehicle speed V, and the like during travel while turning, and adjusts the rear-wheel distribution ratio Xr such that the yaw rate Ryaw detected from time to time by the yaw rate sensor 122 conforms to the target yaw rate Ryawtgt.

The braking force control unit 138 calculates a target deceleration, for example, based on a driver's operation of an accelerator (for example, the accelerator operation amount θacc or a decreasing speed of the accelerator operation amount θacc), the vehicle speed V, a gradient of a downhill road, or a driver's operation of a brake for activating the wheel brakes (for example, the brake operation amount Bra or an increasing speed of the brake operation amount Bra), and sets a required braking force for realizing the target deceleration using a predetermined relationship. The braking force control unit 138 generates the braking force of the four-wheel-drive vehicle 10 such that the required braking force is acquired while the four-wheel-drive vehicle 10 is traveling to decelerate. The braking force of the four-wheel-drive vehicle 10 is generated, for example, based on a braking force by regeneration control using the second rotary machine MG2, that is, a regenerative braking force, a braking force using the wheel brake 101, or a braking force using an engine brake of the engine 12. For example, in view of improvement in energy efficiency, the braking force of the four-wheel-drive vehicle 10 is generated preferentially based on the regenerative braking force. The braking force control unit 138 outputs a command to perform regeneration control using the second rotary machine MG2 to the hybrid control unit 134 such that a regenerative torque required for the regenerative braking force is acquired. The regeneration control using the second rotary machine MG2 is control for causing the second rotary machine MG2 to be rotationally driven using a driven torque input from the wheels 14 and 16 and to operate as a power generator and charging the battery 24 with the generated electric power thereof via the inverter 22.

For example, when the required braking force is relatively small, the braking force control unit 138 realizes the required braking force using only the regenerative braking force. For example, when the required braking force is relatively large, the braking force control unit 138 realizes the required braking force by adding the braking force from the wheel brakes 101 to the regenerative braking force. For example, immediately before the four-wheel-drive vehicle 10 stops, the braking force control unit 138 realizes the required braking force by replacing the regenerative braking force with the braking force from the wheel brakes 101.

For example, when the state of charge value SOC of the battery 24 is equal to or greater than a predetermined state of charge value and thus the regenerative torque of the second rotary machine MG2 is limited and when the braking force of the four-wheel-drive vehicle 10 is insufficient for the required braking force, the braking force control unit 138 generates a braking force from the wheel brakes 101 such that the insufficiency is compensated for.

The regenerative braking force from the second rotary machine MG2 is distributed to the front wheels 14 and the rear wheels 16 with the same distribution as the drive power distribution of the front and rear wheels. When the regenerative torque of the second rotary machine MG2 is limited based on the state of charge value SOC of the battery 24 and the braking force from the wheel brakes 101 is added, it is preferable to curb change in vehicle posture. When the regenerative torque of the second rotary machine MG2 is limited based on the state of charge value SOC of the battery 24 and the braking force from the wheel brakes 101 is generated such that the insufficiency for the required braking force is compensated for, the braking force control unit 138 controls the braking force from the wheel brakes 101 such that the ratio of the braking force applied to the rear wheels 16 to the total braking force applied to the rear wheels 16 and the front wheels 14 is equal to the rear-wheel distribution ratio Xr. That is, the braking force control unit 138 controls the braking force from the wheel brakes 101 such that the ratio of the braking force from the wheel brakes 101 applied to the rear wheels 16 to the total braking force from the wheel brake 101 applied to the rear wheels 16 and the front wheels 14 is equal to the rear-wheel distribution ratio Xr.

Here, when the regenerative torque of the second rotary machine MG2 is limited, for example, the regenerative torque may be limited by an upper limit of the regenerative torque of the second rotary machine MG2 in regeneration control using the second rotary machine MG2. In the following description, the upper limit of the regenerative torque of the second rotary machine MG2 in regeneration control using the second rotary machine MG2 is referred to as a regenerative torque upper limit Vulr. The regenerative torque upper limit Vulr is a threshold value for preventing the wheels 14 and 16 from slipping at the time of traveling of the four-wheel-drive vehicle 10 while decelerating and is predetermined by the braking force control unit 138. In this way, at the time of deceleration of the vehicle, the braking force control unit 138 performs regeneration control using the second rotary machine MG2 and limits the regenerative torque of the second rotary machine MG2 using the preset regenerative torque upper limit Vulr.

In the four-wheel-drive vehicle 10, the rear-wheel distribution ratio Xr is adjusted between 1.0 and 0.5, that is, the drive power distribution of the front and rear wheels is adjusted between 0:100 and 50:50. Accordingly, in the four-wheel-drive vehicle 10, the distribution of the regenerative braking force to the front wheels 14 and the rear wheels 16, that is, the regenerative braking force distribution of the front wheels and rear wheels, is also adjusted between 0:100 and 50:50. When the drive power distribution to the front wheels 14 is small, that is, when the rear-wheel distribution ratio Xr is large, the wheels 14 and 16, particularly, the rear wheels 16 which are main driving wheels, are more likely to slip at the time of performing regeneration control than when the rear-wheel distribution ratio Xr is small. Accordingly, it is conceivable that the regenerative torque upper limit Vulr be set to a constant value similarly to when the drive power distribution to the front wheels 14 is small. However, when the regenerative torque upper limit Vulr is set to a constant value regardless of the rear-wheel distribution ratio Xr, there is concern about maximization of the regenerative torque of the second rotary machine MG2 not being achieved.

Specifically, when the regenerative torque upper limit Vulr is set to "10" similarly to the two-wheel-drive state in which the rear wheels 16 are most likely to slip and the rear-wheel distribution ratio Xr is the largest, the maximum regenerative torque is "10." When the value of the regenerative torque value and the value of the regenerative braking force are set to the same value, the regenerative braking force distribution to the front wheels 14 is "0" and the regenerative braking force distribution to the rear wheels 16 is "10" at the rear-wheel distribution ratio Xr of 1.0, and the maximum regenerative braking force distribution to the front wheels 14 is "5" and the maximum regenerative braking force distribution to the rear wheels 16 is "5" at the rear-wheel distribution ratio Xr of 0.5. At least if the regenerative braking force distribution to the rear wheels 16 can be "10," maximization of the regenerative torque of the second rotary machine MG2 is not achieved at the rear-wheel distribution ratio Xr of 0.5.

Therefore, the braking force control unit 138 sets the regenerative torque upper limit Vulr based on the rear-wheel distribution ratio Xr. Specifically, the braking force control unit 138 sets the regenerative torque upper limit Vulr to a larger value when the rear-wheel distribution ratio Xr is relatively small than when the rear-wheel distribution ratio Xr is relatively large. Examples of the rear-wheel distribution ratio Xr which is used for this control include a rear-wheel distribution ratio based on a value for the electric motor 86 (the electric motor control command signal Sw) instructed by the four-wheel-drive control unit 136, a rear-wheel distribution ratio based on an actual amount of operation (amount of rotation) of the electric motor 86, and a rear-wheel distribution ratio based on an instructed value for power required for the front wheels 14.

The electronic control unit 130 further includes a state determining means, that is, a state determining unit 140, to realize the four-wheel-drive vehicle 10 that can achieve maximization of the regenerative torque of the second rotary machine MG2 in regeneration control at the time of deceleration of the vehicle.

When the control state of the transfer 30 is not determined, that is, when the control state of the transfer 30 is undetermined, there is a likelihood that the wheels 14 and 16 will slip at the time of performing of regeneration control when the regenerative torque upper limit Vulr is set to a large value. It is preferable to cause the braking force control unit 138 to set the regenerative torque upper limit Vulr based on the rear-wheel distribution ratio Xr when the control state of the transfer 30 is determined. The case in which the control state of the transfer 30 is determined includes, for example, a case in which the electric motor 86 operates normally in accordance with the electric motor control command signal Sw, it can be determined that the transfer 30 is controlled such that the actual value of the rear-wheel distribution ratio Xr reaches the target value of the rear-wheel distribution ratio Xr set by the four-wheel-drive control unit 136, and the transfer 30 operates normally, that is, the control state of the transfer 30 is normal.

The state determining unit 140 determines whether the control state of the transfer 30 is normal. The state determining unit 140 determines whether the control state of the transfer 30 is normal, for example, based on whether the electric motor 86 is normally supplied with the electric motor control command signal Sw, that is, the drive current, or whether the electric motor control command signal Sw and the actual operation amount of the electric motor 86 match each other. The actual operation amount of the worm gear 88, the cam mechanism 90, or the like may be used instead of the actual operation amount of the electric motor 86.

When the state determining unit 140 determines that the control state of the transfer 30 is normal, the braking force control unit 138 sets the regenerative torque upper limit Vulr based on the rear-wheel distribution ratio Xr. On the other hand, when the state determining unit 140 determines that the control state of the transfer 30 is not normal, that is, not determined, the braking force control unit 138 sets the regenerative torque upper limit Vulr which does not depend on the rear-wheel distribution ratio Xr.

When the control state of the transfer 30 is undetermined, it may be considered that regeneration control is not performed in view of prevention of the wheels 14 and 16 from slipping with performing of the regeneration control. On the other hand, in view of improvement in energy efficiency, it is preferable to perform the regeneration control to a certain extent even when the control state of the transfer 30 is undetermined.

Therefore, when the control state of the transfer 30 is undetermined, for example, the wheels 14 and 16 are more likely to slip at the time of performing regeneration control than when the rear-wheel distribution ratio Xr is small, and the regenerative torque upper limit Vulr is set similarly to when the rear-wheel distribution ratio Xr is large. That is, the braking force control unit 138 sets the regenerative torque upper limit Vulr which does not depend on the rear-wheel distribution ratio Xr to a value equal to or less than a value which is set when the rear-wheel distribution ratio Xr is large. Since the wheels 14 and 16 are most likely to slip in the two-wheel-drive state, the value which is set when the rear-wheel distribution ratio Xr is large may be a value which is set when the four-wheel-drive vehicle 10 is in the two-wheel-drive state.

Alternatively, when the control state of the transfer 30 is undetermined, it is conceivable that a newest value Vnew of the regenerative torque upper limit Vulr when the control state of the transfer 30 is normal be set as the regenerative torque upper limit Vulr which does not depend on the rear-wheel distribution ratio Xr. In this case, in view of safety, it is preferable to set a value which is slightly less than the newest value Vnew of the regenerative torque upper limit Vulr as the regenerative torque upper limit Vulr which does not depend on the rear-wheel distribution ratio Xr. That is, the braking force control unit 138 sets the regenerative torque upper limit Vulr which does not depend on the rear-wheel distribution ratio Xr to a value ($=Vnew \times \alpha$) which is obtained by limiting the regenerative torque upper limit Vulr ($=Vnew$) based on the rear-wheel distribution ratio Xr which has been set immediately before the state determining unit 140 determines that the control state of the transfer 30 is not determined at a predetermined ratio $\alpha$ ($<1$) or a value ($=Vnew-\beta$) which is obtained by subtracting a predetermined value $\beta$ ($>0$) from the regenerative torque upper limit Vulr. The predetermined ratio $\alpha$ and the predetermined value $\beta$ are, for example, values which are predetermined for setting the regenerative torque upper limit Vulr with a safety margin from the newest value Vnew of the regenerative torque upper limit Vulr with which it is possible to prevent the wheels 14 and 16 from slipping at the time of performing regeneration control while obtaining a certain regenerative torque of the second rotary machine MG2.

When the vehicle speed V is low, the wheels 14 and 16 are less likely to slip at the time of performing regeneration control than when the vehicle speed V is high. The braking force control unit 138 may set the regenerative torque upper limit Vulr which does not depend on the rear-wheel distribution ratio Xr and which is set when the control state of the transfer 30 is undetermined to a value larger when the vehicle speed V is low than when the vehicle speed V is high. That is, a value equal to or less than the value which is set when the rear-wheel distribution ratio Xr is large, for example, a value equal to or less than a value which is set when the four-wheel-drive vehicle 10 is in the two-wheel drive state, a value which is obtained by limiting the regenerative torque upper limit Vulr based on the rear-wheel distribution ratio Xr which has been set immediately before it has been determined that the control state of the transfer 30 is undetermined at the predetermined ratio $\alpha$, or a value which is obtained by subtracting the predetermined value $\beta$ from the regenerative torque upper limit Vulr may be set as the value which is larger when the vehicle speed V is low than when the vehicle speed V is high. In this case, the predetermined ratio $\alpha$ or the predetermined value $\beta$ is, for example, a value based on the vehicle speed V for setting the regenerative torque upper limit Vulr which does not depend on the rear-wheel distribution ratio Xr to a value which is larger when the vehicle speed V is low than when the vehicle speed V is high.

Figure 7:
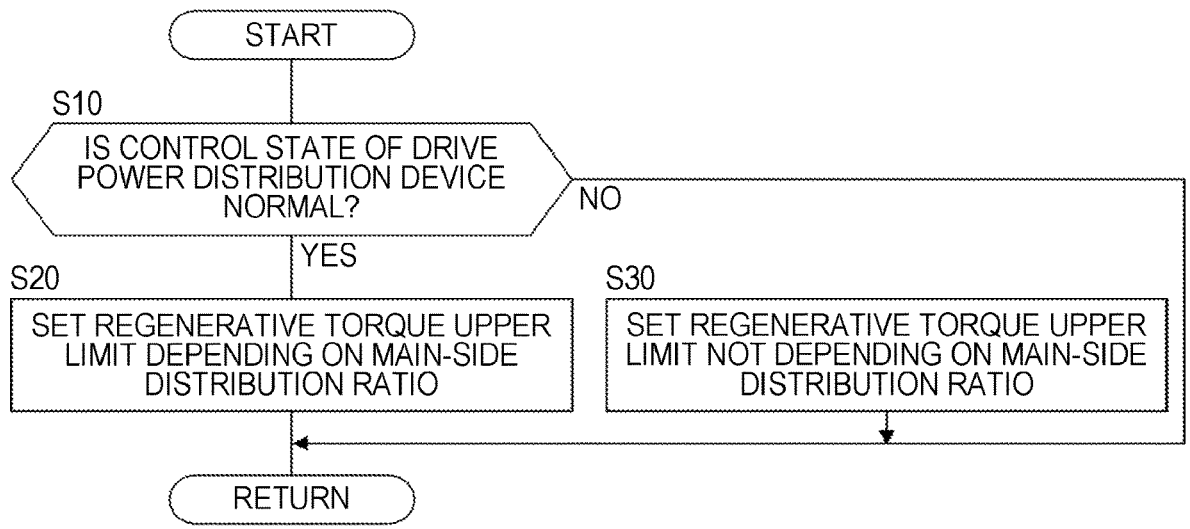
FIG. 7 is a flowchart illustrating a principal part of a control operation of an electronic control unit and a flowchart illustrating a control operation for realizing a four-wheel-drive vehicle in which maximization of a second regenerative torque of a rotary machine in regeneration control can be achieved at the time of deceleration of the vehicle.

FIG. 7 is a flowchart illustrating a principal part of the control operation of the electronic control unit 130 and a flowchart illustrating the control operation for realizing the four-wheel-drive vehicle 10 in which maximization of the regenerative torque of the second rotary machine MG2 in regeneration control can be achieved at the time of deceleration of the vehicle. For example, this flowchart is repeatedly performed.

In FIG. 7, first, in Step (the word "Step" is omitted below) S10 corresponding to the function of the state determining unit 140, it is determined whether the control state of the transfer 30 is normal. When the determination result of S10 is positive, the regenerative torque upper limit Vulr based on the rear-wheel distribution ratio Xr is set in S20 corresponding to the function of the braking force control unit 138. When the determination result of S10 is negative, the regenerative torque upper limit Vulr which does not depend on the rear-wheel distribution ratio Xr is set in S30 corresponding to the function of the braking force control unit 138.

As described above, according to this embodiment, since the regenerative torque upper limit Vulr is set to a value which is larger when the rear-wheel distribution ratio Xr is small than when the rear-wheel distribution ratio Xr is large, the wheels 14 and 16 are less likely to slip at the time of performing regeneration control in comparison with a case in which the drive power distribution to the front wheels 14 is small, and the regenerative torque of the second rotary machine MG2 can be made to be larger when the drive power distribution to the front wheels 14 is large than when the regenerative torque upper limit Vulr is set to a constant value similarly to when the drive power distribution to the front wheels 14 is small. In this case, it is possible to make the regenerative torque of the second rotary machine MG2 larger according to the rear-wheel distribution ratio Xr. Accordingly, in the four-wheel-drive vehicle 10 in which the drive power distribution of the front and rear wheels changes, it is possible to achieve maximization of the regenerative torque of the second rotary machine MG2 in regeneration control at the time of deceleration of the vehicle.

According to this embodiment, when it is determined that the control state of the transfer 30 is not determined, the regenerative torque upper limit Vulr which does not depend on the rear-wheel distribution ratio Xr is set and the regenerative torque upper limit Vulr which does not depend on the rear-wheel distribution ratio Xr has a value equal to or less than the value which is set when the rear-wheel distribution ratio Xr is large. Accordingly, even when the control state of the transfer 30 is undetermined, it is possible to perform regeneration control while curbing slipping of the wheels 14 and 16.

According to this embodiment, the value which is set when the rear-wheel distribution ratio Xr is large is a value which is set when the four-wheel-drive vehicle 10 is in the two-wheel-drive state. Accordingly, even when the control state of the transfer 30 is undetermined, it is possible to perform regeneration control while curbing slipping of the wheels 14 and 16.

According to this embodiment, the regenerative torque upper limit Vulr which does not depend on the rear-wheel distribution ratio Xr has a value which is obtained by limiting the regenerative torque upper limit Vulr based on the rear-wheel distribution ratio Xr which has been set immediately before it is determined that the control state of the transfer 30 is not determined at the predetermined ratio or a value which is obtained by subtracting the predetermined value $\beta$ from the regenerative torque upper limit Vulr. Accordingly, even when the control state of the transfer 30 is undetermined, it is possible to perform regeneration control while curbing slipping of the wheels 14 and 16.

According to this embodiment, the regenerative torque upper limit Vulr which does not depend on the rear-wheel distribution ratio Xr is further set to a value which is larger when the vehicle speed V is low than when the vehicle speed V is high. Accordingly, even when the control state of the transfer 30 is undetermined, it is possible to perform regeneration control while curbing slipping of the wheels 14 and 16.

Another embodiment of the disclosure will be described below. In the following description, parts common to the embodiments will be designated by the same reference signs and description thereof will not be repeated.

The braking force control unit 138 may change the regenerative torque upper limit Vulr with change of the rear-wheel distribution ratio Xr when the rear-wheel distribution ratio Xr has changed while performing regeneration control using the second rotary machine MG2.

When the regenerative torque upper limit Vulr changes to a less value, the regenerative braking force using the second rotary machine MG2 decreases and the braking force of the four-wheel-drive vehicle 10 may be insufficient for the required braking force. The insufficiency for the required braking force may be compensated for by the braking force from the wheel brakes 101. That is, when the braking force of the four-wheel-drive vehicle 10 is insufficient for the required braking force due to change of the regenerative torque upper limit Vulr with change of the rear-wheel distribution ratio Xr while performing regeneration control, the braking force control unit 138 may apply the braking force from the wheel brakes 101 to the wheels 14 and 16 by activating the wheel brake device 100 such that the required braking force is realized.

When the regenerative torque upper limit Vulr has changed and the braking force from the wheel brakes 101 is added, it is preferable to curb change in vehicle posture. Specifically, it is assumed that the regenerative torque upper limit Vulr is set to "20" when the rear-wheel distribution ratio Xr is 0.5 and the regenerative torque upper limit Vulr is set to "10" when the rear-wheel distribution ratio Xr is 1.0. When the rear-wheel distribution ratio Xr changes to 1.0 from the state in which the rear-wheel distribution ratio Xr is 0.5 and the regenerative torque is set to "20," the regenerative torque is "10" and the braking force of the four-wheel-drive vehicle 10 is insufficient for the required braking force. On the other hand, when the regenerative torque and the regenerative braking force have the same value and the rear-wheel distribution ratio Xr is 0.5, the regenerative braking force distribution of the maximum regenerative torque "20" is "10" for the front wheels 14 and "10" for the rear wheels 16. When the rear-wheel distribution ratio Xr is 1.0, the regenerative braking force distribution of the maximum regenerative torque "10" is "0" for the front wheels 14 and "10" for the rear wheels 16. When the insufficiency for the required braking force is compensated for using the braking force from the wheel brakes 101, the braking force distribution from the wheel brakes 101 to the front wheels 14 is "10", and the braking force distribution from the wheel brakes 101 to the rear wheels 16 is "0," the braking force distribution of the four-wheel-drive vehicle 10 to the front wheels 14 is "10," the braking force distribution of the four-wheel-drive vehicle 10 to the rear wheels 16 is "10," the braking force distribution of the four-wheel-drive vehicle 10 when the rear-wheel distribution ratio Xr is 0.5 is maintained, slipping of the wheels 14 and 16 is curbed, insufficiency of the braking force of the four-wheel-drive vehicle 10 is curbed, and the change in vehicle posture is curbed.

The state determining unit 140 determines whether the regenerative torque upper limit Vulr has been changed with change of the rear-wheel distribution ratio Xr by the braking force control unit 138 while performing regeneration control using the second rotary machine MG2. When it is determined that the regenerative torque upper limit Vulr has been changed, the state determining unit 140 determines whether the braking force of the four-wheel-drive vehicle 10 becomes insufficient for the required braking force due to the change of the regenerative torque upper limit Vulr.

When the state determining unit 140 determines that the braking force of the four-wheel-drive vehicle 10 becomes insufficient for the required braking force due to the change of the regenerative torque upper limit Vulr, the braking force control unit 138 activates the wheel brake device 100 such that the required braking force is realized, and applies the braking force from the wheel brakes 101 to the wheels 14 and 16 such that the braking force distribution of the four-wheel-drive vehicle 10 to the rear wheels 16 and the front wheels 14 does not change from the state before the regenerative torque upper limit Vulr has changed (that is, before the rear-wheel distribution ratio Xr has changed) when the wheel brake device 100 is activated.

Figure 8:
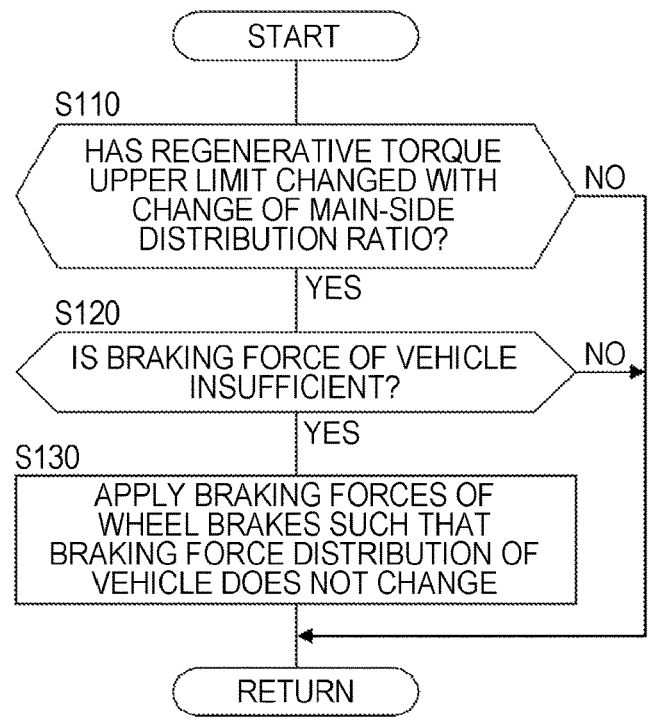
FIG. 8 is a flowchart illustrating a principal part of a control operation of an electronic control unit and a flowchart illustrating a control operation when a regenerative torque upper limit is changed with change of a rear-wheel distribution ratio.

FIG. 8 is a flowchart illustrating a principal part of the control operation of the electronic control unit 130 and a flowchart illustrating the control operation when the regenerative torque upper limit Vulr is changed with change of the rear-wheel distribution ratio Xr. For example, this flowchart is repeatedly performed.

In FIG. 8, first, in S110 corresponding to the function of the state determining unit 140, it is determined whether the regenerative torque upper limit Vulr has changed with change of the rear-wheel distribution ratio Xr while performing regeneration control using the second rotary machine MG2. When the determination result of S110 is negative, the present routine ends. When the determination result of S110 is positive, it is determined whether the braking force of the four-wheel-drive vehicle 10 becomes insufficient for the required braking force due to the change of the regenerative torque upper limit Vulr in S120 corresponding to the function of the state determining unit 140. When the determination result of S120 is negative, the present routine ends. When the determination result of S120 is positive, the wheel brake device 100 is activated such that the required braking force is realized in S130 corresponding to the function of the braking force control unit 138. At this time, the braking force from the wheel brakes 101 is applied such that the braking force distribution of the four-wheel-drive vehicle 10 does not change from the state before the regenerative torque upper limit Vulr has changed.

As described above, according to this embodiment, when the braking force of the four-wheel-drive vehicle 10 is insufficient for the required braking force due to change of the regenerative torque upper limit Vulr with the change of the rear-wheel distribution ratio Xr and the wheel brake device 100 is activated, the braking force from the wheel brakes 101 is applied such that the braking force distribution of the four-wheel-drive vehicle 10 to the rear wheels 16 and the front wheels 14 does not change from the state before the regenerative torque upper limit Vulr has changed. Accordingly, it is possible to curb change in vehicle posture due to change of the distribution of the braking force of the four-wheel-drive vehicle 10 applied to the rear wheels 16 and the front wheels 14 with the activation of the wheel brake device 100 while curbing the insufficiency of the braking force of the four-wheel-drive vehicle 10.

While embodiments of the disclosure have been described above in detail with reference to the accompanying drawings, the disclosure may be applied to other aspects.

For example, in the aforementioned embodiments, when the control state of the transfer 30 is undetermined, the regenerative torque upper limit Vulr which does not depend on the rear-wheel distribution ratio Xr is set. In this regard, for example, when the control state of the transfer 30 in a current rip is normal and the control state of the transfer 30 has ever been undetermined before the current rip, the regenerative torque upper limit Vulr which does not depend on the rear-wheel distribution ratio Xr may be set. Alternatively, when it is determined that the control state of the transfer 30 is undetermined in the current trip and the control state of the transfer 30 is normal after the current trip, the regenerative torque upper limit Vulr which does not depend on the rear-wheel distribution ratio Xr may be set. The trip is, for example, traveling of a vehicle from ignition-on to ignition-off.

In the aforementioned embodiments, the four-wheel-drive vehicle 10 is a four-wheel-drive vehicle with an FR type vehicle as a base, a part-time four-wheel-drive vehicle which switches between two-wheel-drive travel and four-wheel-drive travel according to a travel state, a hybrid vehicle with the engine 12, the first rotary machine MG1, and the second rotary machine MG2 as drive power sources, or a four-wheel-drive vehicle including the automatic transmission 28 in which the stepless gear shifting unit 44 and the stepped gear shifting unit 46 are connected in series, but the disclosure is not limited to the aspect. For example, the disclosure may be applied to a four-wheel-drive vehicle with an FF (front-engine front-drive) type vehicle as a base, a full-time four-wheel-drive vehicle, or an electric vehicle with only a rotary machine as a drive power source. Alternatively, the disclosure may be applied to a four-wheel-drive vehicle including, as an automatic transmission, a known planetary gear type automatic transmission, a synchromesh parallel biaxial automatic transmission including a known dual clutch transmission (DCT), a known belt type stepless transmission, or a known electrical stepless transmission. Alternatively, an electric vehicle using only a rotary machine as a drive power source may not include, for example, an automatic transmission. In a four-wheel-drive vehicle with an FF type vehicle as a base, the front wheels serve as main driving wheels, the rear wheels serve as sub driving wheels, and the front-wheel distribution ratio Xf serves as a main-side distribution ratio. In a full-time four-wheel-drive vehicle in which a central differential gear unit (a center differential) including a differential limit clutch is provided, for example, the drive power distribution of the front and rear wheels is a predetermined drive power distribution such as 30:70 when the differential limit clutch that limits a differential operation of the center differential is not activated, and the drive power distribution of the front and rear wheels is changed to 50:50 when the differential limit clutch is activated. Briefly speaking, the disclosure can be applied to any four-wheel-drive vehicle as long as it includes a drive power source including at least a rotary machine, a drive power distribution device that can transmit a drive power from the drive power source to main driving wheels and sub driving wheels and adjust a main-side distribution ratio, and a control device that controls the rotary machine and the drive power distribution device.

In the aforementioned embodiments, the piston 84 of the front-wheel-driving clutch 70 constituting the transfer 30 is configured to move to the frictional engagement element 82 via the cam mechanism 90 and to press the frictional engagement element 82 when the electric motor 86 rotates, but the disclosure is not limited to this aspect. For example, the piston 84 may be configured to press the frictional engagement element 82 via a ball screw or the like that converts a rotational motion to a translational motion when the electric motor 86 rotates. The piston 84 may be driven by a hydraulic actuator.

The aforementioned embodiments are merely examples and the disclosure can be embodied in aspects subjected to various modifications and improvements based on the knowledge of those skilled in the art.

What is claimed is:

1. A four-wheel-drive vehicle comprising:
a drive power source configured to include at least a rotary machine;
a drive power distribution device configured to transmit a drive power from the drive power source to main driving wheels and sub driving wheels and to adjust a main-side distribution ratio which is a ratio of a drive power which is transmitted to the main driving wheels to a total drive power which is transmitted from the drive power source to the main driving wheels and the sub driving wheels; and
a control device configured to control the rotary machine and the drive power distribution device,
wherein the control device is configured to perform regeneration control using the rotary machine at the time of deceleration of the vehicle, to limit a regenerative torque of the rotary machine using a preset upper limit of the regenerative torque in the regeneration control, and to set the upper limit to a value which is larger when the main-side distribution ratio is small than when the main-side distribution ratio is large.

2. The four-wheel-drive vehicle according to claim 1, wherein the control device is configured to set the upper limit when it is determined that a control state of the drive power distribution device is undetermined and to set the upper limit to a value equal to or less than a value set when the four-wheel-drive vehicle is in a two wheel drive state.

3. The four-wheel-drive vehicle according to claim 1, wherein the control device is configured to set the upper limit when it is determined that a control state of the drive power distribution device is undetermined and to set the upper limit to a value which is obtained by limiting the upper limit based on the main-side distribution ratio which has been set immediately before it has been determined that the control state of the drive power distribution device is undetermined at a predetermined ratio or by subtracting a predetermined value from the upper limit.

4. The four-wheel-drive vehicle according to claim 2, wherein the control device is configured to set the upper limit to a value which is larger when a vehicle speed is low than when the vehicle speed is high, when it is determined that the control state of the drive power distribution device is undetermined.

5. The four-wheel-drive vehicle according to claim 1, wherein the control device is configured to activate a wheel brake device which is provided to adjust braking forces of wheel brakes applied to the main driving wheels and the sub driving wheels such that a required braking force is realized when a braking force of the four-wheel-drive vehicle is insufficient for the required braking force due to change of the upper limit based on change of the main-side distribution ratio and to apply the braking forces of the wheel brakes such that a distribution of the braking force of the four-wheel-drive vehicle applied to the main driving wheels and the sub driving wheels is maintained at the distribution of the braking force of the four-wheel-drive vehicle before the upper limit changes when the wheel brake device is activated.

* * * * *